April 4, 1961 E. A. CARLSON 2,978,228
CONTROL APPARATUS
Filed Aug. 15, 1957 3 Sheets-Sheet 1

INVENTOR.
ELMER A. CARLSON
BY Robert S. Craig
ATTORNEY

April 4, 1961 E. A. CARLSON 2,978,228
CONTROL APPARATUS
Filed Aug. 15, 1957 3 Sheets-Sheet 2
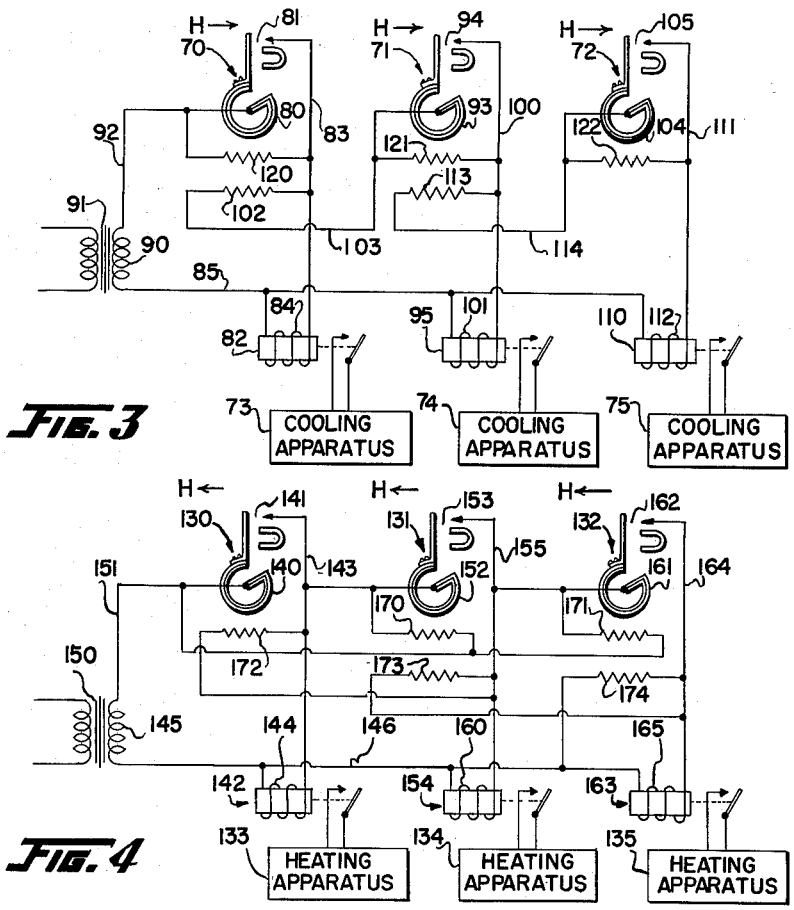
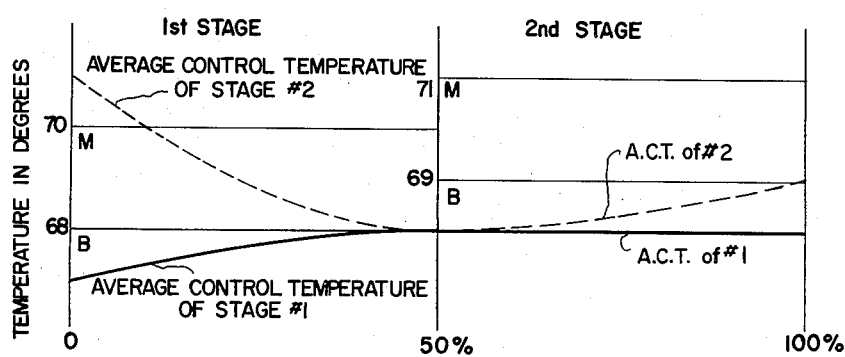
INVENTOR.
ELMER A. CARLSON
BY Robert S. Craig
ATTORNEY April 4, 1961     E. A. CARLSON     2,978,228
CONTROL APPARATUS Filed Aug. 15, 1957     3 Sheets-Sheet 3

INVENTOR.
ELMER A. CARLSON
BY Robert S. Craig
ATTORNEY

United States Patent Office 2,978,228
Patented Apr. 4, 1961

2,978,228

CONTROL APPARATUS

Elmer A. Carlson, Minneapolis, Minn., assignor to Minneapolis-Honeywell Regulator Company, Minneapolis, Minn., a corporation of Delaware Filed Aug. 15, 1957, Ser. No. 678,288

8 Claims. (Cl. 257—288)

The present invention is concerned with an improved condition control system, in particular, a system for controlling a plurality of stages of condition changing apparatus.

Where a plurality of stages of condition changing apparatus, such as temperature changing apparatus for heating or cooling, are controlled, it is desired to have a wide differential between the control points of the adjacent stages without detrimentally affecting the overall operation. The closer the control points of adjacent stages of conditioning apparatus are calibrated the harder it is to maintain individual operation of the stages. With a wide differential between stages the overall variation in control point for a change from zero to 100% load may not be acceptable. Ideally it is desirable in a system having a plurality of stages to have wide differentials between stages at all levels of load except at the percentage load where a transfer between stages takes place. When the load reaches the percent where changeover to the next stage is desired the control points of the controllers or thermostats of the adjacent stages are modified so that there is substantially no differential between the adjacent stages.

The present invention provides for operation of a plurality of stages of temperature changing devices from temperature responsive devices such as thermostats. As the conditioning load changes the control points of the thermostats of adjacent stages are modified by lowering the control point of one and raising the other so that at a given percent load where changeover is set there is little difference in the control points.

It is therefore an object of the present invention to provide an improved condition control system for a plurality of condition changing devices.

Another object of the present invention is to provide in a two-stage temperature control system an adjustment in the control points of each of the stages so that at low or high loads there is an appreciable differential in the control points of the stages and yet at the load where changeover from the operation of one stage to the operation of the other there is a minimum differential.

And still another object of the present invention is to provide in the plurality of temperature control devices for controlling a multistage conditioning system a smooth crossover between operation of the stages and yet while any one stage is in operation the differential between it and other stages is relatively large;

And a further object of the present invention is to provide an arrangement in which a multistage control system provides minimum space temperature difference between no load and full load;

And still a further object of the present invention is to provide an arrangement in which a multistage control system in which the thermostats may have the same basic control point and sequential operation is provided by heaters which change the effective control points of the several thermostats.

These and other objects will become apparent upon a study of the following specification and drawings of which:

Figure 3 is a schematic representation of a three-stage cooling system.

Figure 4 is a schematic representation of a three-stage heating system.

Figure 5 is a graphical representation of the operation of the two-stage system shown in Figure 1.

Figure 1:
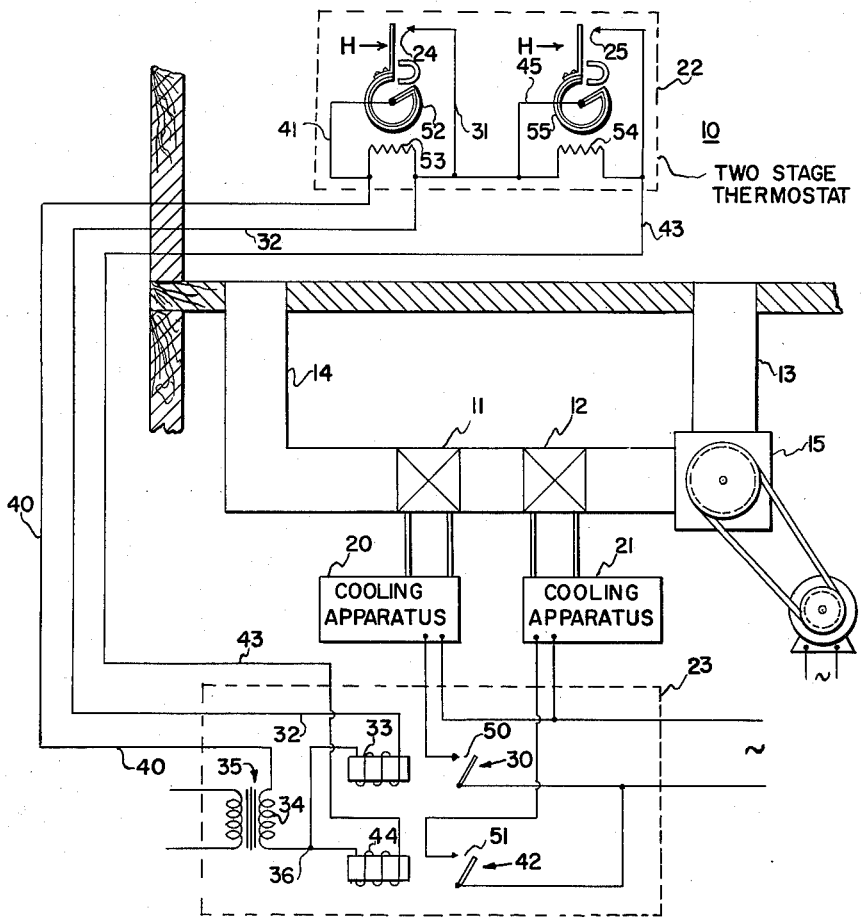
Figure 1 is a schematic representation of the present invention showing two stages of temperature control for a two-stage cooling system.

Referring to Figure 1, the temperature of a space 10 is controlled by circulating air from a return duct 13 through cooling coils 11 and 12 to a supply duct 14 by a fan 15. Coils 11 and 12 are supplied with cooling medium by cooling apparatus 20 and 21 of a conventional type, the details of which are not shown. The control system of the cooling apparatus comprises a thermostat 22 and a panel 23. The thermostat has a pair of snap acting temperature responsive switches 24 and 25 which close when the temperature of space 10 drops below a predetermined value. Switch 24 is connected to control the operation of a relay 30 in the panel through a circuit traced as follows: from switch 24, a conductor 31, a conductor 32, a winding 33 of relay 30, a secondary 34 of a transformer 35, a conductor 40, a conductor 41 and back to switch 24. Switch 25 controls the operation of a relay 42 through a circuit traced as follows: from switch 25, a conductor 43, a winding 44 of relay 42, terminal 36, secondary 34, a conductor 40, switch 24, conductor 31, a conductor 45 and back to switch 25. Relay 30 has a switch 50 associated therewith which closes when the relay is energized to connect cooling apparatus 20 to a source of power. Relay 42 has a similar switch 51 associated therewith which closes upon energization of the relay to connect cooling apparatus 21 to the source of power. The energization of relay 42 and the second stage of the cooling apparatus 21 can only be brought about when switch 24 is closed and the first stage is energized.

Connected in parallel with switch 24 and associated in terminal relation to a temperature responsive device or bimetal 52 of the switch is a heater 53. This heater is effective to offset the control point of the thermostat by adding heat to the portion of the thermostat made up of bimetal 52 whenever switch 24 is opened and also provide a cycling thermostat which is necessary for best control. This is normally known as heat acceleration and is quite commonly done with cooling thermostats. A similar heater 54 is connected in parallel with switch 25 to heat a bimetal 55 which operates switch 25.

In calibrating thermostats the calibration is generally known as the "cold" calibration or basic control point adjustment. While there are other ways of calibration, for explanation purposes let us assume a heating thermostat calibration is at the make point of the switch that is the temperature where the thermostat closes. A cooling thermostat's calibration is at the break point of the switch, that is the temperature where the thermostat opens.

*Operation of Figure 1*

The apparatus as shown in Figure 1 is not in operation as both stages of the thermostat 22 are satisfied and the switches are open. Let us assume that the temperature of space 10 increases and bimetal 52 closes switch 24 to initiate operation of the first stage cooling apparatus 20. Each time the switch 24 closes the heat experienced by bimetal 52 from heater 53, for offsetting the control point, is shut down. This decrease in heat tends to raise the average control temperature of this stage of the thermostat.

Referring to Figure 5 a graphical representation of the average control temperature versus the load for the two parts of thermostat 22 is shown. The average control temperature (ACT) or control point is the average temperature the thermostat maintains in the space when it is in control of the heating or cooling apparatus. In the graphical representation of Figures 5, 6 and 8 the average control temperatures are shown when the thermostats are and are not in control. Assuming that the transfer between full operation of apparatus 20 and the initial operation of apparatus 21 is selected at 50% load. By means of heater 53 the average control temperature of stage one or switch 24 would gradually increase as the load increases approaching some selected value such as 68° F., depending on the initial calibration. As the percent on time of switch 24 increased with an increased load the heat from heater 54 to the second stage of the thermostat would increase to drive the average control temperature of switch 25 or stage two downward as shown. As the percent load approaches 50% the average control temperatures of the two stages would be approximately the same and upon a transfer from full operation of stage one to the initial operation of stage two there is little differential therebetween. At a load slightly less than 50% the switch 24 would be closed a high percentage of the time and heater 54 would be supplying a maximum heat to lower the control point of the second stage. Upon operation of the second stage by the closing of switch 25 heater 54 is shorted out. As the heat is cut down the average control temperature of the second stage increases as the load approaches 100%. Stage one will remain continuously on with no change in its heat from heater 53 and will maintain a relatively constant control point as shown at loads over 50%. By this type of operation it is apparent that there would be little differential between the stages upon the transition from the load of cooling apparatus 20 to the additional load of cooling apparatus 21. At low and high loads the differential between the stages is quite large.

Figure 7:
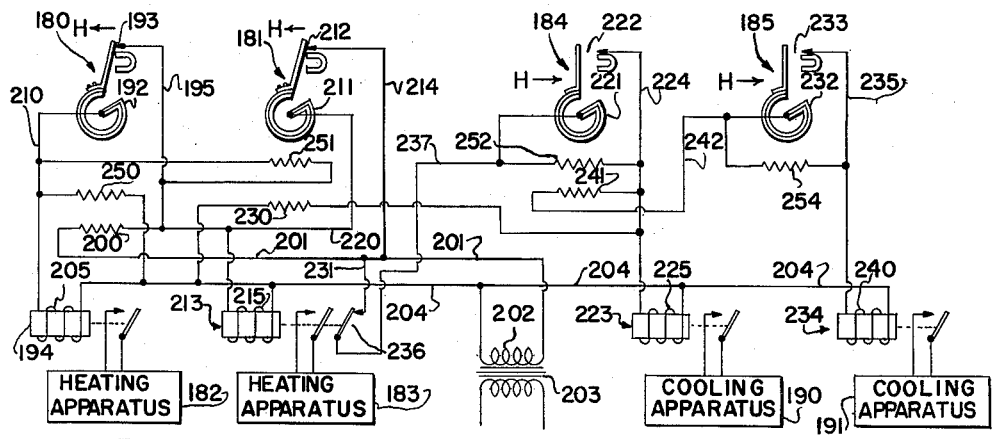
Figure 7 is a schematic diagram of a heating and cooling system in which two stages of heating and two stages of cooling are controlled.

While the graphical representation of Figure 5 shows the thermostats with different cold calibrations, that is, the make M and break B temperatures, it is obvious that a multistage control system could have thermostats with the same basic control point, such as will become obvious upon the study of Figure 7. The heaters would be adjusted in size to provide the necessary change in the effective control point of the thermostats so sequential operation could take place.

In the particular representation shown in Figure 5 it is seen that the average control point at zero load is 67° F. and at 100% load 69° F. This relatively small two degree change is obtained with a differential between stages which heretofore has not been generally possible.

At the same time the differential between units at the low load is very wide to insure that transient changes in the space temperature do not bring about operation of both stages. This has been especially troublesome in the prior art where two stage thermostats were adjusted with small differentials between stages. For example a sudden warm breeze on the thermostat at low load often caused the second stage to come on and then drop out. This added capacity even for a short period at low load often results in an upsetting of proper temperature control.

DESCRIPTION OF FIGURE 2

Figure 2:
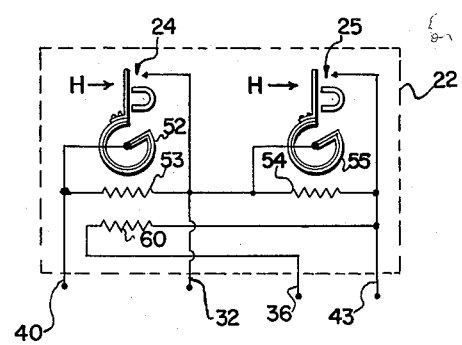
Figure 2 is another embodiment of the apparatus shown in Figure 1.

Referring to Figure 2, a second embodiment of thermostat 22 is shown and would be connected to the apparatus of Figure 1. The thermostat 22 of Figure 2 has a heater 60 associated in thermal relation to the temperature responsive device 52. This heater is connected to switch 25 in a parallel circuit with winding 44 to be energized when switch 25 closes.

Operation of Figure 2

Figure 6:
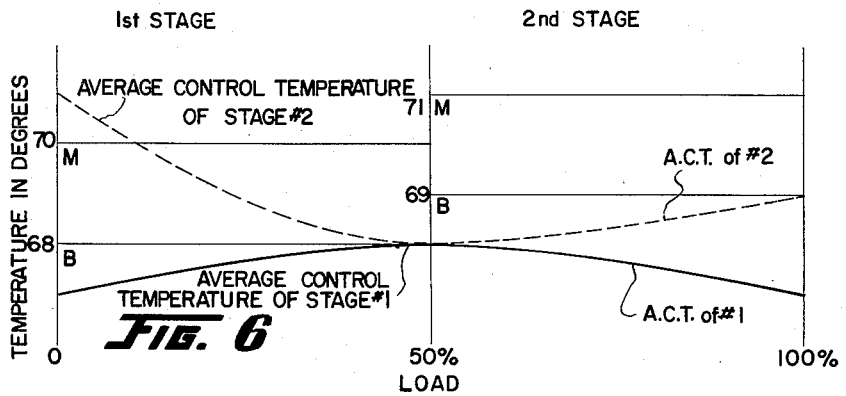
Figure 6 is a graphical representation of the two-stage system shown in Figure 2.

In Figure 6 a similar graphical representation of the operation of the system of Figure 1 is shown using the thermostat as shown in Figure 2. The operation of the stages are substantially the same as in Figure 1. As the percent on time of switch 24 increases the average control point of stage 1 increases up to a selected temperature of 68° F. at the 50% load or a 100% on time of cooling apparatus 20. As the percent on time of switch 24 increases the heat applied to the second stage bimetal 55 by heater 54 decreases the average control point of the second stage. As the load increases and switch 25 closes to energize the second stage of cooling it not only shunts out heater 54 to begin to decrease the heat to bimetal 55 but heat is applied to bimetal 52 by heater 60. The decrease of heat to bimetal 55 as the percent on time of switch 25 increases is effective to raise the average control temperature as shown. The increase in heat supplied to bimetal 52 by heater 60 as the percent on time of switch 25 increases, lowers the average control point of the first stage. This increases the differential between the stages over the embodiment as shown in Figure 1. This increase in differential between the stages is apparent upon a comparison of the graphical representations shown in Figures 5 and 6.

It is obvious that the wider the differential between the adjacent stages becomes at high and low loads, the less effect transient conditions have on the thermostat. The embodiment of Figure 2 provides a method to widen the differential between the stages and yet a smooth transition is accomplished where control is transferred from stage 1 to stage 2.

DESCRIPTION OF FIGURE 3

Referring to Figure 3, a plurality of stages of cooling apparatus are shown. Thermostats 70, 71 and 72 are connected to control cooling apparatus 73, 74 and 75, respectively. Thermostat 70 comprises a bimetal 80 for closing a switch 81 when the temperature in the space exceeds some predetermined value. Switch 81 is connected to relay 82 by a circuit as follows: from switch 81, a conductor 83, a relay winding 84, a conductor 85, a secondary 90 of a transformer 91, a conductor 92, and back to switch 81. Thermostat 71 comprises a bimetal 93 for controlling a switch 94 which closes when the temperature of the bimetal exceeds some predetermined value. Switch 94 is connected to a relay 95 through a circuit as follows: from switch 94, a conductor 100, a winding 101 of relay 95, conductor 85, secondary 90, conductor 92, switch 81, a low impedance heater 102, a conductor 103, and back to switch 94. As is obvious in comparing the disclosure of Figure 2 and Figure 3 the interchangeability of voltage and current heaters such as 60 and 102 for obtaining the same function respectively, is common to one skilled in the art. Thermostat 72 comprises a bimetal 104, for closing a switch 105 when the temperature of the bimetal exceeds a predetermined value. Switch 105 is connected to a relay 110 through a circuit as follows: from switch 105, a conductor 111, a winding 112 of relay 110, conductor 85, secondary 90, conductor 92, switch 81, heater 102, switch 94, a low impedance heater 113, a conductor 114, and back to switch 105. Heater 102 is associated in thermal relation to thermostat 70 and heater 113 is associated in thermal relation to thermostat 71. Connected in parallel with switch 81 is a heater 120 of a high impedance type. Connected in parallel with switches 94 and 105 are similar high impedance heaters 121 and 122, respectively. Relay 82, 95 and 110 have associated switches which are closed to energize cooling apparatus 73, 74 and 75, respectively when the relays are energized.

*Operation of Figure 3*

At zero load thermostats 70, 71 and 72 are satisfied and their associated switches are open. As the cooling load increases, that is the temperature of the space rises above the predetermined value, switch 81 closes to initiate operation of cooling apparatus 73. Heater 120 has been energized with switch 81 open to lower the control point of thermostat 70. As the percent on time of switch 81 increases the amount of heat supplied to the thermostat 70 by heater 120 will decrease. This causes the control point to increase as was heretofore explained in connection with the apparatus shown in Figure 1 and Figure 2. At the same time as the percent on time of stage 1 increases, the heat output of heater 121 increases to drive the average control point of stage 2 or thermostat 71 downward. Since heater 102 is a low impedance heater the low current passing through heater 121 has little effect and thus the heat output of heater 102 at this time can be neglected. At the crossover point between the first and second stages which might be around 33% load, thermostat 70 is calling for 100% operation of cooling apparatus 73 and thermostat 71 begins operation of cooling apparatus 74. The percent on time of switch 94 determines the amount of heat given off by heater 102 and as the percent on time increases the heat output of heater 102 increases to drive the average control point of thermostat 70 downward. This insures that switch 81 remains closed and cooling apparatus 73 remains energized as the differential between stages one and two is widened. As the percent on time of switch 94 increases the average control point of thermostat 71 increases under the influence of heater 121 as was the case with heater 120.

At approximately 66% load which for explanation purposes might be the crossover point between the second and third stages, the third stage thermostat 72 begins to operate. Switch 94 is now closed 100% of the time. The percent on time of switch 105 determines the heat output of heater 113. As the percent on time increases the control point of thermostat 71 is driven downward to maintain energization of the second stage of cooling. This is also true for thermostat 70 as heater 102 and 113 are in series. Upon operation of thermostat 71 the control point of thermostat 72 is lowered as heater 122 is cycled depending upon the percent on time of switch 94. At 100% on time of switch 94 a maximum amount of heat is supplied by heater 122 to lower the control point of thermostat 72. Once switch 105 begins to close it shunts heater 122 to cut down the amount of heat supplied to the thermostat 72 to gradually increase the control point.

With three stages of cooling as shown it is obvious by the proper calibration of the thermostats it is possible to have a smooth transition between stages of operation and yet the differential between the stages would remain relatively high as the load changed.

DESCRIPTION OF FIGURE 4

In Figure 4 a plurality of stages of heating are controlled, in particular three having thermostats 130, 131, and 132 for controlling heating apparatus 133, 134, and 135, respectively. Thermostat 130 has a bimetal 140 effective to control the operation from the switch 141. Switch 141 is connected to control relay 142 through a circuit as follows: from switch 141, a conductor 143, a relay winding 144, a secondary 145 of a transformer 150, a conductor 151, bimetal 140, and back to switch 141. Thermostat 131 has a bimetal 152, for controlling the operation of a switch 153 which is connected to control relay 154 through a circuit as follows: from switch 153, a conductor 155, a relay winding 160, conductor 146, secondary 145, conductor 151, switch 141, conductor 143, bimetal 152 and back to the switch 153. Thermostat 132, has a bimetal 161 for controlling the operation of a switch 162 which is connected to control a relay 163 through a circuit as follows: a conductor 164, a relay winding 165, conductor 146, secondary 145, conductor 151, switch 141, conductor 143, switch 153, conductor 155, bimetal 161, and back to switch 162. Each of the relays 142, 154, and 163, have associated switches for controlling heating apparatus 133, 134, and 135, respectively whenever the relays are energized by the thermostats. Connected in parallel with switch 153 is a resistance heater 170. Connected in parallel with switch 162 is a resistance heater 171. Both of these heaters are in thermal relationship with the bimetals of their associated switches so that when the heaters are energized the control points of the respective thermostats are lowered. Connected in parallel with switch 153 is a heater 172 which is associated in thermal relationship to bimetal 140 of thermostat 130. Connected in parallel with switch 162 is a resistance heater 173 which is associated in thermal relationship to bimetal 152 of thermostat 131. Connected in parallel with relay winding 165 is a heater 174 which is associated in thermal relationship to bimetal 161.

*Operation of Figure 4*

The stages of heating as shown in Figure 4 are all satisfied and none are in operation. Heat is being applied to thermostats 131 and 132 by heaters 170 and 171 respectively to reduce their control points to maintain them off during the operation of thermostat 130. Upon a call for heat by thermostat 130 switch 141 is closed to initiate operation of heating apparatus 133. As heater 170 is also connected in parallel with switch 141 it is shunted out and the heat to thermostat 131 is decreased as the percent on time of thermostat 130 increases. This drives the control point of thermostat 131 upward. Heater 172 is energized proportional to the on time of thermostat 130 and acts as the heat anticipating heater driving its control point downward. At 100% load of the first stage heater 172 is energized continuously and heater 170 is de-energized. Any increase in the load causes thermostat 131 to close switch 153 initiating the operation of heating apparatus 134. The closing of switch 153 shunts out heater 171 to decrease the amount of heat supplied to thermostat 132 and thus begins to increase the control point. At the same time the heater 172 is shunted out by switch 153 to increase the control point of thermostat 130. Thermostat 130 is thereby maintained closed during the operation of thermostat 131. Heater 173 is energized proportional to the on time of thermostat 131 and acts as the heat anticipating heater driving its control point downward. The closing of switch 153 also decreases the heat output of resistance 171 by shunting it through the circuit comprising switch 141 and switch 153. As the percent on time of thermostat 131 increases, the control point of thermostat 132 increases. Upon the initial operation of thermostat 132 heater 173 is shunted to decrease the heat output to thermostat 131 as the percent on time of switch 162 increased. This increases the control point of thermostat 131 to maintain it on during the operation of the portion of the total load which would be taken care of by thermostat 132. At the same time heater 174 applies heat to thermostat 132 as its percent on time increased in a normal heat anticipation manner. It is obvious that as the operation of the system changed with the percent load the transition between the stages of control would be quite gradual and the differential between stages would be wide on each side of the transition load.

DESCRIPTION OF FIGURE 7

The apparatus of Figure 7 is used for controlling two stages of heating apparatus and two stages of cooling apparatus. Thermostats 180 and 181 are for controlling heating apparatus 182 and 183, respectively and are the second and first stages of heating respectively. Thermostats 184 and 185 for controlling cooling apparatus 190 and 191, respectively, and are the first and second stages of cooling, respectively. Thermostats 180, 181, 184, and 185 all have the same basic control point adjustment. Thermostat 180 comprises a bimetal 192 for controlling the operation of a switch 193 which is connected to control relay 194 through a circuit as follows: from switch 193, a conductor 195, a conductor 220, switch 212, conductor 214, a conductor 201, a secondary 202 of a transformer 203, a conductor 204, a winding 205 of relay 194, a conductor 210, and back to switch 193 through bimetal 192. Thermostat 181 comprises a bimetal 211 for operating a switch 212. Switch 212 is connected to control the operation of relay 213 through a circuit as follows: from switch 212, a conductor 214, conductor 201, secondary 202, a relay winding 215 of relay 213, a conductor 220, and back to switch 212 through bimetal 211. Thermostat 184 has a bimetal 221 for controlling the operation of switch 222 which is connected to control the operation of a relay 223 through a circuit as follows: from switch 222, a conductor 224, a relay winding 225 of relay 223, conductor 204, secondary 202, conductor 201, a conductor 231, a normally closed relay contact of relay 213, a conductor 237 and back to switch 222 through bimetal 221. A high impedance heater 230 associated in thermal relation to bimetal 211 is connected in parallel with relay winding 225. Thermostat 185 has a bimetal 232, for controlling the operation of the switch 233 which controls the operation of relay 234 through a circuit traced as follows: from switch 233, a conductor 235, a winding 240 of relay 234, conductor 204, secondary 202, conductor 201, conductor 231, contact 236 of relay 213, conductor 237, switch 222, conductor 224, a low impedance heater 241 associated in thermal relation with bimetal 221, a conductor 242, and back to switch 233 through bimetal 232. Relays 194, 213, 223, and 234, have associated switches for controlling heating apparatus 182, and 183, and cooling apparatus 190 and 191, respectively each time the relays are energized. Connected in parallel with winding 205 is a high impedance heater 250 associated in thermal relationship with bimetal 192. Connected in parallel with switch 193 is a high impedance heater 251 associated in thermal relationship with bimetal 211. Connected in parallel with switch 212 is a high impedance heater 200 associated in thermal relationship with bimetal 192. A high impedance heater 252 is connected in parallel with switch 222 and a high impedance heater 254 is connected in parallel with switch 233. Heater 252 is associated in thermal relationship with bimetal 221 and heater 254 is associated in thermal relationship with bimetal 233.

*Operation of Figure 7*

As shown in Figure 7 the two stages of heating are in operation as thermostats 180 and 181 are closed. Making use of the graphical representation shown in Figure 8 the operation of the multi-stage system of Figure 7 will be explained in steps. For this illustration, all for thermostats are calibrated to have the same make M and break B temperatures. Assuming that we are at a 100% heating load, that is, to the extreme left of the graph shown in Figure 8. With the switch 193 closed the relay is energized to initiate operation of heating apparatus 182. Heater 250 connected in parallel with the relay would also be energized and at a 100% load with switch 193 closed continuously a maximum heat would be applied to bimetal 192 and the control point of thermostat 180 is along the 70° line as shown. With switch 193 closed heater 251 of the first stage of heating is shunted out and the control point of thermostat 181 is driven upward depending upon the percent on time of thermostat 180. It is seen that as the percent on time of stage two heating increases the differential between the first and second stages of heating increases. As the percent load decreases to approximately 50% of the heating load, the control points of thermostats 180 and 181 approach one another so that a smooth transition can be accomplished between stages one and two.

Figure 8:
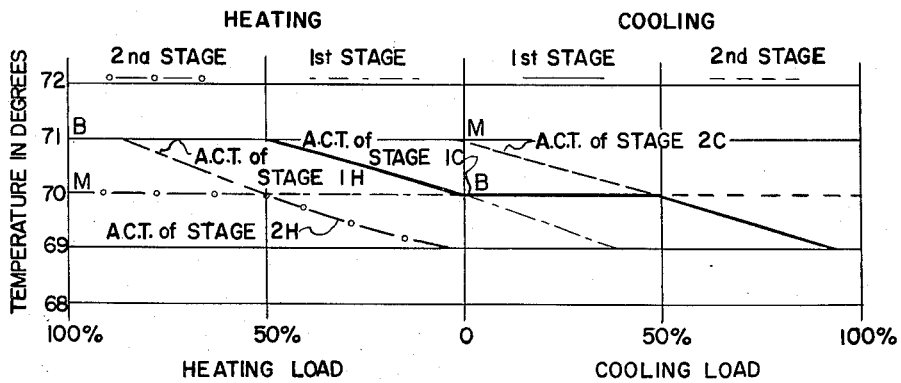
Figure 8 is a graphical representation of the operation of the multi-stage system shown in Figure 7.

As the percent load of heating decreases to less than 50%, switch 193 of the second stage of heating remains open 100% of the time and switch 212 of the first stage of heating begins to cycle. Each time switch 212 opens the shunt circuit is removed from heater 200 and heat is applied to thermostat 180 to drive its average control point down thus as the percent load of the first stage heating decreases the differential between the first and second stages of heating increases. Furthermore each time switch 212 opens contacts 236 close to connect secondary 202 to the cooling thermostats. The addition of heat to thermostat 184 as thermostat 181 cycles is accomplished through relay 236 by energizing heater 252 in series with winding 225 and is effective to lower the average control point of thermostat 184 as the load decreases on the first stage of heating. At the zero load point as shown in the graph of Figure 8 the average control point of thermostat 184 approaches that of thermostat 181 and a smooth changeover between heating and cooling takes place. As the heating load becomes zero and the cooling load increases both thermostats 180 and 181 are satisfied and thermostat 184 initiates operation of cooling apparatus 190 by closing switch 222. Upon closing switch 222 relay 223 is energized and high impedance heater 230 is energized so that as the percent on time of thermostat 184 increases the amount of heat to thermostat 181 increases to drive its control point down. This would increase the differential between the first stage heating thermostat 181 and the first stage cooling thermostat 184 as shown in the graph of Figure 8. Each time thermostat 184 closed to initiate operation of its cooling device heater 254 is energized through the circuit including heater 241. Since the impedance of heater 241 is low the amount of heat given off to thermostat 184 is ineffective on its control point. As the percent on time of thermostat 184 increases the heat from 254 increases to lower the average control point of thermostat 185 and the differential between these two stages becomes zero at the 50% cooling load. Upon an increase in the cooling load above 50% thermostat 185 closes to initiate operation of cooling apparatus 191. When switch 233 closes heater 254 is shunted to decrease the amount of heat applied to the thermostat and thus the average control point of thermostat 185 follows along the horizontal line at 70°. The closing of switch 233 also energizes heater 241 to heat up thermostat 184 depending upon the percent on time of thermostat 185. The control point of thermostat 184 is driven downward thus increasing the differential between the thermostats of stage one and two as the percent cooling load increased.

The importance of a multi-stage system having thermostats with the same basic control point adjustment or "cold calibration" wherein the heaters are used to insure sequential operation of the stages can not be over emphasized. Such a system provides a lower differential in space temperature as the load varies between zero and 100%.

It is obvious that the circuitry for accomplishing the present invention might be changed by one skilled in the art to obtain the overall system operation intended thus the disclosure is for one particular manner of accomplishing the present invention. It is intended that the scope of the invention be limited only by the appended claims.

I claim:
1. In a temperature control apparatus for controlling two stages of cooling apparatus for cooling a space, first bimetal operated switch means responsive to the temperature of the space and providing a closed circuit when the space temperature exceeds a predetermined value, a first heating element associated in thermal relation to said first bimetal means, first relay means adapted to control a first of the stages of cooling, a source of power, connection means including said first switch means for connecting said first relay means to said source so that upon a call for cooling the first stage is energized, means connecting said first heating element in parallel with said first switch means so that when said first switch means is open said heating element lowers the control point of said first switch means, second bimetal operated switch means responsive to the temperature of the space and providing a closed circuit when said space temperature exceeds a predetermined value, a second heating element associated in thermal relation to said second bimetal means, second relay means adapted to control a second of said stages of cooling, connection means including said second switch means for connecting said second relay means to said source, means connecting said second heating element in parallel with said first switch means in a manner so that when said first switch means is closed said second element is energized through said second relay means, thus as said first switch means calls for cooling said heating element of said second switch means is effective to lower its control point.

2. In a temperature control system for controlling a plurality of temperature changing devices, first temperature responsive switch means adapted to control a first of the temperature changing devices, first heating means associated with said first temperature responsive switch means for reducing the control point thereof, circuit means connecting said heating means in parallel with said first switch means so that it is de-energized each time said first switch means closes thereby modifying the control point of said first temperature responsive switch means, second temperature responsive switch means adapted to control a second of the temperature changing devices, second heating means associated with said second temperature responsive switch means, circuit means connecting said second heating means in parallel with said second switch means so that each time said second switch means is closed said second heating means is de-energized, and circuit means connecting said second heater means in series with said first switch means to be energized each time said first responsive switch means closes.

3. In a temperature control device for controlling two stages of cooling apparatus, first temperature responsive switch means, circuit means adapted for connecting said first switch means in a controlling relation to the first stage cooling apparatus, second temperature responsive switch means, circuit means including said first switch means for connecting said second switch means in controlling relation to the second cooling stage, a first heater connected to be energized upon the operation of said first switch means for raising the control point of said first switch means as the percent on time of the first stage increases, a second heater connected to be energized upon the operation of said second switch means, said second heater being effective to decrease the control point of said second switch means as the percent on time of said first switch means increases, a third heater associated with said first switch means, and circuit means connecting said third heater to be energized upon the operation of said second switch means so that the control point of said first switch means is decreased as the percent on time of said second switch means increases.

4. In temperature control apparatus for controlling first and second temperature changing devices, first temperature responsive means, second temperature responsive means, circuit means adapted to connect said first responsive means in controlling relation to the first temperature changing device, circuit means including said first responsive means adapted to connect said second responsive means in a controlling relation to the second changing device so that the second responsive means is ineffective unless said first responsive means is calling for operation of the first changing device, means associated with said first responsive means for modifying the control point thereof as the load on the first condition changing apparatus increases, means associated with said second responsive means to modify the control point thereof as the load on the first changing device changes, and means associated with said first responsive means to further modify the control point thereof as the load on the second changing device increases.

5. In temperature control apparatus for controlling the operation of a plurality of temperature changing devices, first temperature responsive switch means adapted to control one of the plurality of temperature changing devices, first heater means connected in parallel with said first switch means for modifying the control point of said first switch means as the load of the one temperature changing device increases, second temperature responsive switch means adapted to control a second of the temperature changing devices, second heater means connected in parallel with said second switch for modifying the control point of said second switch means as the load of the second changing device increases, said second heater means being energized to lower the control point of said second switch means as the load of the first changing device increases, and third heater means associated with said first switch means and connected in series with said second switch means, said third heater means being energized each time said second switch means calls for operation of the second changing device and thus the control point of said first switch means decreases as the load of the second changing device increases.

6. In temperature control apparatus for controlling a plurality of cooling devices, first temperature responsive switch means adapted to control a first of the cooling devices, a first heater connected in parallel with said switch means for changing the control point of said switch means as the load of the first device increases, second temperature responsive switch means, connecting means including said first switch means adapted to connect said second switch means to control the second of the cooling devices, a second heater connected in parallel with said second switch means so that the control point of said second switch means is changed as the load of the first cooling device increases and is changed further as the load of the second cooling device increases, and a third heater associated in thermal relation to said first switch means for changing the control point of said first switch means as the load of the second device increases.

7. In temperature control apparatus for controlling a plurality of heating devices, first temperature responsive switch means adapted to control one of the heating deices, a second temperature responsive switch means connected in series with said first switch means and adapted to control a second of the heating devices whenever said first switch means is calling for heat, a first heater associated in thermal relation to said first switch means and connected in parallel with said second switch means for changing the control point of said first switch means as the load on the second heating device increases, and a second heater associated in thermal relation to said second switch means and connected in parallel therewith for changing the control point of said second switch means as the load of the first device increases.

8. In a temperature control apparatus for controlling a plurality of heating and cooling devices, first temperature responsive means adapted to control a first of the heating devices, second temperature responsive means adapted to control a second of the heating devices, third temperature responsive means adapted to control a first of the cooling devices, fourth temperature responsive means adapted to control a second of the cooling devices, heating means associated with each of said temperature responsive means, means including said heating means of said second, third and fourth responsive means for raising the control points of said last mentioned responsive means during the operating range of said first responsive means, further means including said heating means of the first, third and fourth responsive means for lowering the control point of said first responsive means and raising the control point of said third and fourth responsive means, means including said heating means of said first, second and fourth responsive means for lowering the control point of said first and second responsive means and raising the control point of said fourth responsive means throughout the operating range of said third responsive means, and means including said heating means of said first, second, and third responsive means for lowering the control point of said first, second and third responsive means throughout the operating range of said fourth responsive means.

References Cited in the file of this patent

UNITED STATES PATENTS

| | | |
|---|---|---|
| 2,281,399 | Wattles | Apr. 28, 1942 |
| 2,451,566 | Lehane et al. | Oct. 19, 1948 |
| 2,518,996 | Peckham | Aug. 15, 1950 |
| 2,595,644 | Davis | May 6, 1952 |
| 2,640,649 | Rusler | June 2, 1953 |

FOREIGN PATENTS

| | | |
|---|---|---|
| 219,187 | Switzerland | May 1, 1942 |